US 008179908B2

(12) United States Patent
Zhu et al.

(10) Patent No.: US 8,179,908 B2
(45) Date of Patent: May 15, 2012

(54) PACKET NETWORK SYSTEM WITH SESSION CHANGING FUNCTION AND IMPLEMENTATION METHOD AND DEVICE THEREOF

(75) Inventors: Dongming Zhu, Shenzhen (CN); Hengliang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 463 days.

(21) Appl. No.: 12/256,638

(22) Filed: Oct. 23, 2008

(65) Prior Publication Data
US 2009/0103532 A1 Apr. 23, 2009

Related U.S. Application Data

(63) Continuation of application No. PCT/CN2007/001256, filed on Apr. 17, 2007.

(30) Foreign Application Priority Data

Apr. 25, 2006 (CN) .......................... 2006 1 0074998

(51) Int. Cl.
*H04L 12/28* (2006.01)
*H04L 12/66* (2006.01)
*H04W 4/00* (2009.01)
*G06F 15/16* (2006.01)

(52) U.S. Cl. ........ 370/401; 370/352; 370/389; 455/435; 709/227

(58) Field of Classification Search .......... 370/254–329, 370/338–352, 365–389; 455/414–435; 709/224–229

See application file for complete search history.

(56) References Cited

U.S. PATENT DOCUMENTS

| 2005/0083909 | A1 | 4/2005 | Kuusinen et al. |
| 2006/0095501 | A1* | 5/2006 | Mochida ........................ 709/203 |
| 2006/0105766 | A1* | 5/2006 | Azada et al. ............... 455/432.1 |
| 2007/0036143 | A1* | 2/2007 | Alt et al. ........................ 370/352 |
| 2007/0121608 | A1* | 5/2007 | Gu et al. ........................ 370/356 |

(Continued)

FOREIGN PATENT DOCUMENTS

| CN | 1522022 | 8/2004 |
| CN | 1756242 | 4/2006 |
| EP | 1619853 A | 1/2006 |
| GB | 2398204 A | 8/2004 |
| WO | WO-2006010614 | 2/2006 |

OTHER PUBLICATIONS

"3rd Generation Partnership Project; Technical Specification Group Services and System Aspects; Telecommunication management; Charging management; Charging architecture and principles (Release 6); 3GPP TS 32.340", ETSI Standards, LIS, Sophia Antipolis Cedex, France, vol. 3-SA, No. V6.0.0, Sep. 1, 2004, XP014022018.

(Continued)

*Primary Examiner* — M. Phan
(74) *Attorney, Agent, or Firm* — Brinks Hofer Gilson & Lione

(57) ABSTRACT

The present invention provides a method for session changing. The method for session changing is designed for session changing during interworking between a first UE and a second UE in a packet network, and includes: reserving, during setup of an initial session between the first UE and the second UE, an interworking control function for logically controlling the interworking on a path of the initial session; and performing, when the interworking control function receives a subsequent session change request, the corresponding session changing operation according to contents of the subsequent session change request. The invention further provides a device for session changing and a packet network system with session changing function.

7 Claims, 7 Drawing Sheets

U.S. PATENT DOCUMENTS

| | | | |
|---|---|---|---|
| 2007/0263615 A1* | 11/2007 | Zhu et al. | 370/356 |
| 2008/0108338 A1* | 5/2008 | Herrero et al. | 455/414.3 |
| 2008/0200170 A1* | 8/2008 | Sun et al. | 455/435.1 |
| 2008/0274739 A1* | 11/2008 | Wu | 455/435.1 |
| 2008/0298353 A1* | 12/2008 | Zhu et al. | 370/356 |
| 2009/0052438 A1* | 2/2009 | Zhu et al. | 370/352 |
| 2010/0070632 A1* | 3/2010 | Song et al. | 709/227 |

OTHER PUBLICATIONS

Written Opinion of the International Searching Authority issued in corresponding PCT Application No. PCT/CN2007/001256; mailed Jul. 26, 2007.

First Office Action issued in corresponding Chinese Patent Application No. 200610074998.5; mailed Dec. 5, 2008.

Second Office Action issued in corresponding Chinese Patent Application No. 200610074998.5; Jul. 10, 2009.

"$3^{rd}$ Generation Partnership Project; Technical Specification Group Services and System Aspects; Combining Circuit Switched (CS) and IP Multimedia Subsystems (IMS) Services; Stage 2 (Release 7)." Global System for Mobile Communication. Mar. 2006.

"$3^{rd}$ Generation Partnership Project; Technical Specification Group Services and System Aspects; Network Architecture" Global System for Mobile Communication. Mar. 2006.

* cited by examiner

PACKET NETWORK SYSTEM WITH SESSION CHANGING FUNCTION AND IMPLEMENTATION METHOD AND DEVICE THEREOF

The present application is a continuation of International patent application serial No. PCT/CN2007/001256, filed Apr. 17, 2007, which claims the benefit of Chinese patent application serial No. 200610074998.5, entitled "Packet Network System with Session Changing Function and Implementation Method and Device Thereof" and filed with the Chinese Patent Office on Apr. 25, 2006, both of which are incorporated herein by reference in their entireties.

FIELD OF THE INVENTION

The present invention relates to the field of communication, particularly to a packet network system with session changing function, and a method and a device for session changing during interworking between a CSI User Equipment (CSI UE) and an IMS User Equipment (IMS UE) in the packet network.

BACKGROUND OF THE INVENTION

The Combining CS and IMS services (CSI) are a research subject of great concern in the 3rd Generation Partnership Project (3GPP) standard. This research subject aims at combining Circuit Switch (CS) domain services and IP Multimedia Subsystem (IMS) domain services in the 3G.

The primary research topic in the CSI phase 1 aims at correlating a CS domain call of a CS IMS dual-mode UE with an IMS session. Due to the limitation in bearing capacity, a CSI phase 1 UE utilizes in precedence the CS to bear real-time voice services.

Unless otherwise specified, the CSI UE mentioned hereinafter refers to the CSI phase 1 UE. During the interworking between the CSI UE and the IMS UE, there exists such a situation that if the IMS UE calls the CSI UE through IMS signaling to establish a voice session, the IMS session directly reaches the IMS part of the CSI UE, and an IMS voice session is established directly between these two UEs after the CSI UE receives the request message. However, due to limits of QoS and the like of the IMS at the CSI UE side, the CSI UE would preferably establish a real-time voice session through the CS.

FIG. 1 shows a framework for interworking between the CSI UE and the IMS UE in the prior art (3GPP TS 23.002 Network Architecture).

The following technologies relate to the subject on the implementation of the interworking between the CSI UE and the IMS UE.

An interworking control function is arranged at the CSI UE side. Upon the receipt of a session request from the IMS UE, the interworking control function separates the session message involving a variety of media components according to the relevant information, divides the session into a session containing a real-time media component and a session containing a non-real-time media component, then makes a determination according the relevant information to terminate the real-time session in the CS domain and terminate the non-real-time session in the IMS. The framework of this technical scheme is shown in FIG. 1, and the process includes the following steps.

At step S102, a Voice over IP (VoIP) UE initiates a request (e.g., an Invite) for an IMS session to a CSI UE, with the request containing real-time service information and non-real-time service information.

At step S104, the IMS (including the MGCF/MGC, S-CSCF, etc.) at the VoIP side forwards the request to the CSI-Interworking (CSI-IW).

At step S106, the CSI-IW carries out service logical processing and separates the session request according to the relevant information.

At step S108, a session request is sent to the CSI UE by the CSI-IW. The request message contains non-real-time service information and indication information instructing the CSI UE to initiate a CS bearing from the CSI UE to the network.

At step S110, upon the receipt of the session request message, the CSI UE initiates a CS call (e.g., a SETUP request) to the CSI-IW.

At step S112, the Media Gateway Control Function (MGCF) receives the CS call request from the CSI UE, maps the CS call request into an INVITE, and sends the INVITE to the CSI-IW.

At step S114, the CSI-IW sends a 200 OK response to the MGCF.

At step S116, the MGCF maps the 200 OK response into a CS CONNECT message to be sent to the CSI UE.

At step S118, the CSI UE sends a 200 OK response which contains only non-real-time media information (e.g. an MSRP message).

At step S120, the CSI-IW combines the CS call from the CSI UE with the IMS session.

At step S22, the CSI-IW sends a 200 OK response after the combination to the called IMS.

At step S124, the called IMS forwards the 200 OK response to the VoIP UE.

However, a session change during interworking between the CSI UE and the IMS UE may be desired, while the architecture and the process in the prior art provide no solution to session changing during interworking between the CSI UE and the IMS UE in the packet network.

Therefore, a solution to address the issue of session changing during interworking between the CSI UE and the IMS UE in the prior art is desired.

SUMMARY OF THE INVENTION

According to embodiments of the present invention, there is provided a packet network system with session changing function, a method and a device for session changing during interworking between the CSI UE and the IMS UE in the packet network, which substantially addresses the issue of session changing during interworking between the CSI UE and the IMS UE.

The technical schemes according to the embodiments of the present invention include the following.

A method for session changing, adapted to change a session during interworking between a first UE and a second UE in a packet network, including:

reserving, during setup of an initial session between the first UE and the second UE, an interworking control function for controlling the interworking, on a path of the initial session; and when a subsequent session change request is received, performing, by the interworking control function, the corresponding session changing operation according to contents of the subsequent session change request.

A device for session changing, adapted to change a session during interworking between a first UE and a second UE in a packet network, including:

an initial session logic processing module, adapted to reserve, during setup of an initial session between the first UE and the second UE, an interworking control function for logically controlling the interworking, on a path of the initial session; and a session change performing module, adapted to perform, when the interworking control function receives a subsequent session change request, the corresponding session changing operation according to contents of the subsequent session change request.

A packet network system including: a first UE and a second UE used in the packet network, and a Serving-Call Session Control Function (S-CSCF) for the home domain of the first UE; the packet network system further including:

an interworking control function, adapted to receive a session request from the Serving-Call Session Control Function, and to be reserved, during setup of an initial session between the first UE and the second UE, on a path of the initial session; and further to perform, upon the receipt of a subsequent session change request, the corresponding session changing operation according to contents of the session change request.

With above technical schemes, the present invention implements session changing during interworking between the CSI UE and the IMS UE.

Other features and advantages of the present invention will be described in the following description, and these features and advantages will become apparent partially from the description or be understood from the embodiments. The objects and other advantages of the present invention can be implemented and achieved through the architecture that is specially stated in the description, the claims, and the accompanying drawings.

BRIEF DESCRIPTION OF THE DRAWINGS

The accompanying drawings described herein are provided for better understanding of the present invention, and are part of the present application. The illustrative embodiments and the associated description are intended to explain the present invention, and shall not be construed as any improper limit to the present invention.

DETAILED DESCRIPTION OF THE EMBODIMENTS

Hereinafter, the present invention will be described in detail with reference to the accompanying drawings.

The principles of the present invention will be described below with reference to FIGS. 2 and 3.

Figure 1:
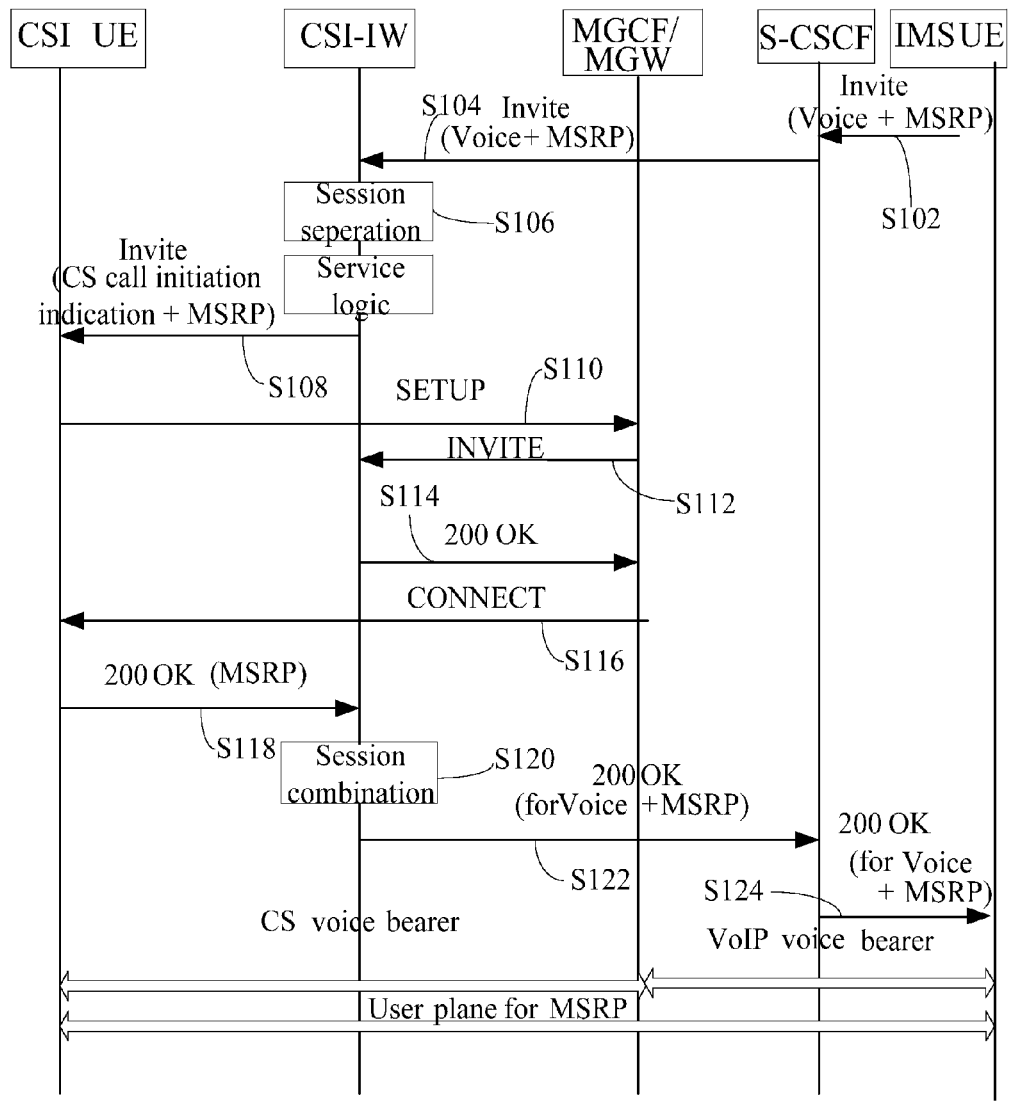
FIG. 1 shows the framework for interworking between a CSI UE and an IMS UE in the prior art.
Figure 2:
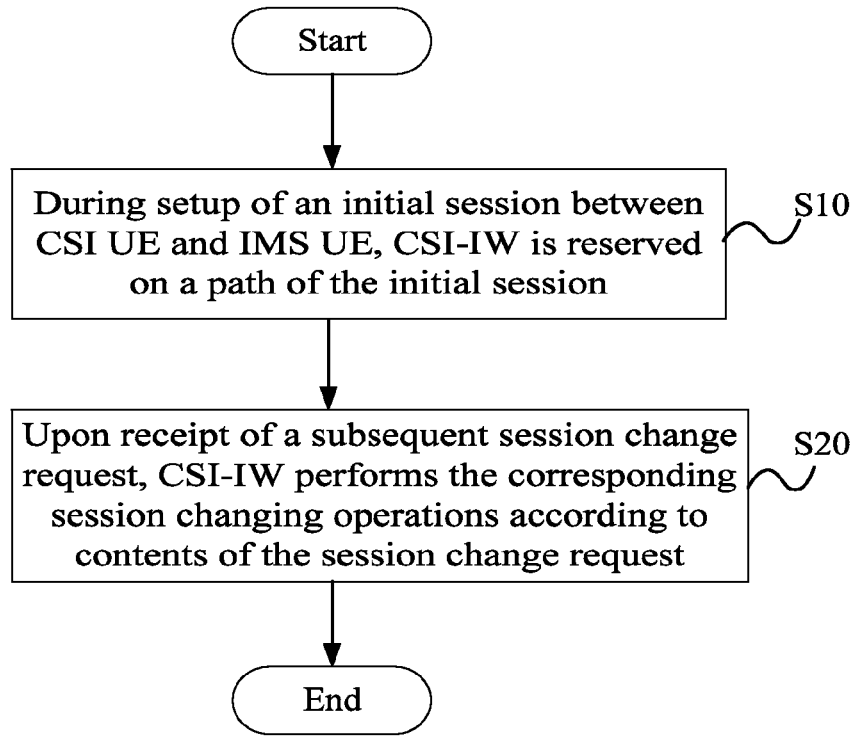
FIG. 2 shows a flow chart of the method for session changing according to the present invention.

A flow chart of the method for session changing according to principles of the present invention is shown in FIG. 2, and includes:

at step S10, during setup of an initial session between a first UE and a second UE, a CSI-IW for logically controlling the interworking is reserved on a path of the initial session; and at step S20, upon the receipt of a subsequent session change request, the CSI-IW performs the corresponding session changing operation according to contents of the session change request. Here, the contents of the session change request include: removing one or more media components from a plurality of media components included in the initial session; adding one or more media components to the initial session; and processing upon a change on bearing information of the media in the initial session.

Figure 3:
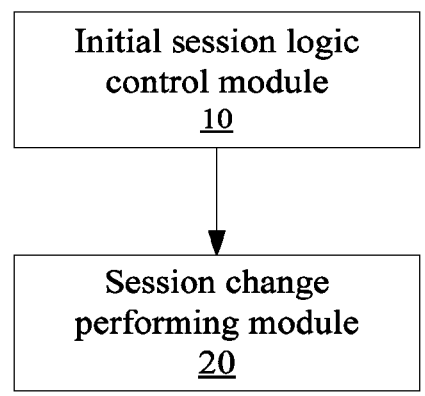
FIG. 3 shows a block diagram of the device for session changing according to the present invention.

A block diagram of the device 100 for session changing according to principles of the present invention is shown in FIG. 3, including:

an initial session logic control module 10, adapted to reserve, during setup of an initial session between a first UE and a second UE, a CSI-IW for logically controlling the interworking, on a path of the initial session; and A session change performing module 20, adapted to perform, when the CSI-IW receives a subsequent session change request, the corresponding session changing operation according to contents of the subsequent session change request. Here, the contents include: removing one or more media components from a plurality of media components included in the initial session; adding one or more media components to the initial session; and processing upon a change on bearing information of the media in the initial session.

The above-mentioned device for session changing is an interworking control function.

The first UE and second UE in FIGS. 2 and 3 above may be a CSI UE and an IMS UE respectively. It shall be appreciated that both the first UE and the second UE have IMS service capability.

Figure 4:
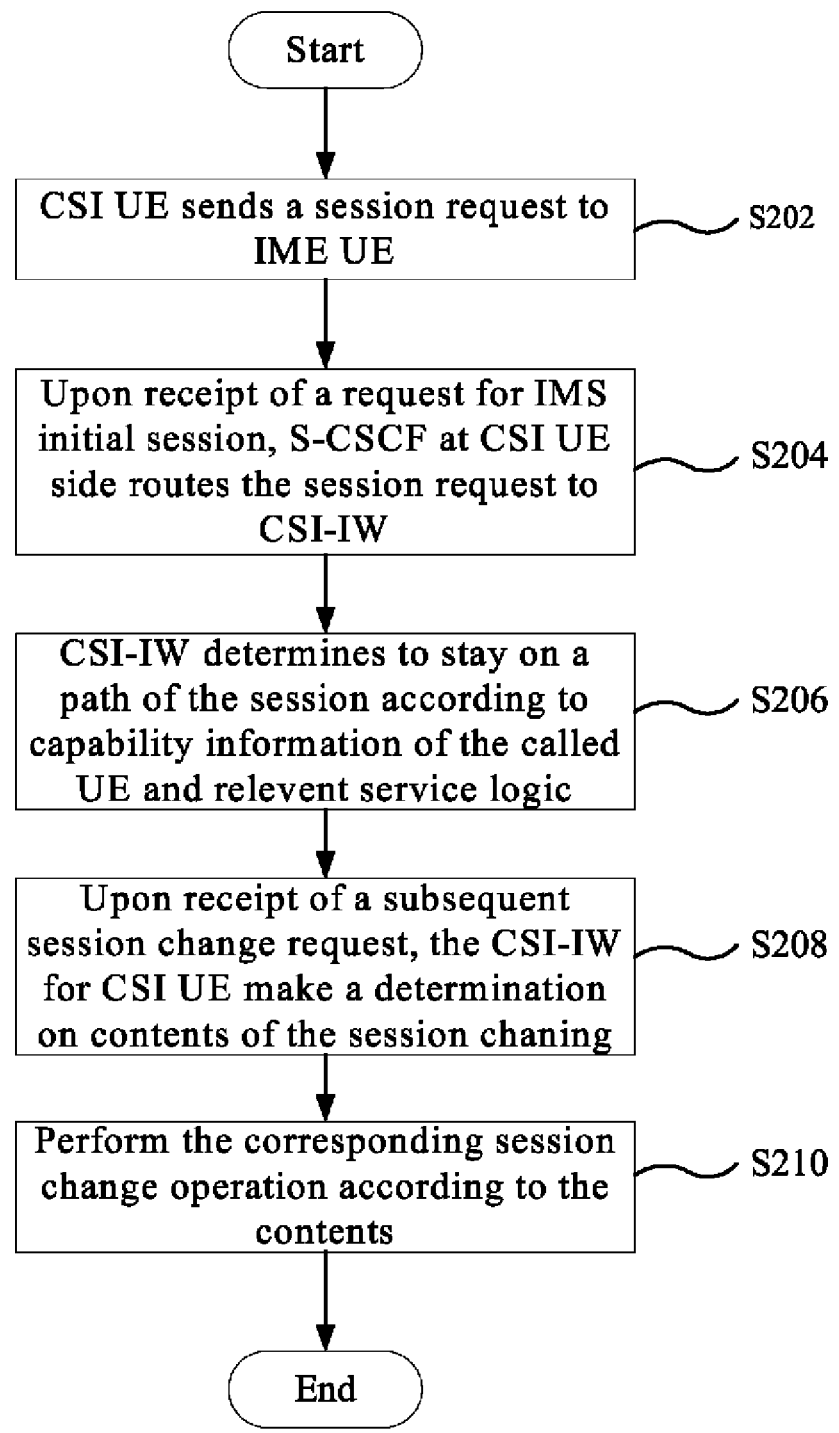
FIG. 4 shows a flow chart of the method for session changing during interworking between a CSI UE and an IMS UE according to the present invention.

With the principles of the invention as shown in FIGS. 2 and 3, the method for session changing during interworking between the CSI UE and the IMS UE according to the invention includes the following steps, as shown in FIG. 4:

at step S202, the CSI UE sends a session request to the IMS UE;

at step S204, upon the receipt of the IMS initial session request, the Serving-CSCF (S-CSCF) at the CSI UE side routes the session request to the interworking control function CSI-IW; and at step S206, the CSI-IW determines to stay on a path of the session according to the capability information of the called UE and the relevant service logic.

In order to implement the session changing, optionally the method further includes the following steps:

at step S208, upon the receipt of the subsequent session change request, the interworking control function CSI-IW at the CSI UE side determines the content of the session changing, here, the content of the session changing may selectively include: removing one or more media components from a plurality of media components for the original session, for example, a real-time media component or a non-real-time media component is removed; or adding one or more media components to the original session, for example, a real-time media component or a non-real-time media component and the like is added; and processing upon a change on bearing information of the media for the initial session; and at step S210, the corresponding session changing operation is performed according to the content of the session changing above.

Specifically, the process of the method for session changing according to the invention includes the following:

upon the receipt of any IMS initial session request, the S-CSCF at the CSI UE side routes the IMS session request to the CSI-IW;

Upon the receipt of the IMS session request message, the CSI-IW at the CSI UE side determines whether to stay on the path of the session according to the capability information of the local-side UE, the capability information of the access network where the local-side UE is located, and the relevant service logic.

If the Local-side UE has the CSI UE capability and/or the IP access network at the local side does not support real-time media bearing capacity, the interworking control function CSI-IW stays on the path of this session.

The CSI-IW can obtain capability information of the UE through the following ways:

The CSI-IW obtains the capability information of the CSI UE from the registration information of the CSI UE;

The CSI-IW queries the capability information of the CSI UE from another system such as the Device Management (DM) system.

Furthermore, upon the receipt of the subsequent session change request, the CSI-IW performs the corresponding session changing operation as follows.

1) If the session changing is to remove one or more media components from a plurality of media components for the original session:

if a real-time media component for the session with the CSI UE is to be removed, the CSI-IW release the CS call between the CSI-IW and the CSI UE;

if a non-real-time media component for the session with the CSI UE is to be removed, the CSI-IW initiates a change on the media of the original non-real-time IMS session between the CSI-IW and the CSI UE, to remove the non-real-time media component from the media.

2) If the session changing is to add one or more media components to the original session:

in the case that a real-time media component for the session with the CSI UE is to be added, if a CS call already exists between the CSI-IW and the CSI UE, the addition of the real-time media fails for this time; if no CS call exists between the CSI-IW and the CSI UE, the CSI-IW initiates a call to the CS part of the CSI UE, and this CS call is to be used to bear the real-time media component;

in the case that a non-real-time media component for the session with the CSI UE is to be added, if no IMS session exists between the CSI-IW and the CSI UE, the CSI-IW initiates a new non-real-time IMS session with the CSI UE; if an IMS session already exists between the CSI-IW and the CSI UE, the CSI-IW initiates a change on the existing non-real-time IMS session with the CSI UE, so that a new non-real-time media component is added.

3) If a change on the media bearing part for the session with the CSI UE is to be dealt with, the CSI-IW initiates a change on information of the media bearing for the session with the IMS UE;

4) If a change on the media bearing part for the session with the IMS UE is to be dealt with, the CSI-IW initiates a change on information of the media bearing for the session with the CSI UE.

5) The CSI-IW can further combine the above-mentioned media addition and removal in any way, so as to meet particular demands in particular scenarios.

On the basis of above method, the present invention provides a system for session changing during interworking between a CSI UE and an IMS UE, and the system includes: a first UE and a second UE adapted for the packet network, and a Serving-Call Session Control Function for the home domain of the first UE, wherein the first UE and the second UE can be a CSI UE and an IMS UE respectively. It should be appreciated that both the first UE and the second UE have IMS service capability.

The S-CSCF for the Home Domain of the CSI UE:

Any received initial session request message is routed to the CSI-IW for processing.

CSI-IW:

Upon the receipt of the initial session request message, the CSI-IW determines whether to stay on the path of the session according to the capability information of the Local-side UE, the capability information of the access network where the Local-side UE is located, and the relevant service logic.

If the Local-side UE has the CSI UE capability, and/or the access network where the Local-side UE is located does not support real-time media bearing capacity, the CSI-IW chooses to stay on the path of this session.

The CSI-IW can obtain capability information of the UE through the following ways.

The CSI-IW obtains the capability information of the CSI UE from the registration information of the CSI UE;

The CSI-IW queries the capability information of the CSI UE from another system.

Furthermore, upon the receipt of the subsequent session change request, the CSI-IW performs the corresponding session changing operation as follows.

1) If the session changing is to remove one or more media components from a plurality of media components for the original session:

if a real-time media component for the session with the CSI UE is to be removed, the CSI-IW removes the CS call between the CSI-IW and the CSI UE;

if a non-real-time media component for the session with the CSI UE is to be removed, the CSI-IW initiates a change on the media of the original non-real-time IMS session between the CSI-IW and the CSI UE, to remove the non-real-time media component for the session.

2) If the session changing is to add one or more media components to the original session:

in the case that a real-time media component for the session with the CSI UE is to be added, if a CS call already exists between the CSI-IW and the CSI UE, this addition of the real-time media fails; if no CS call exists between the CSI-IW and the CSI UE, the CSI-IW initiates a call to the CS part of the CSI UE, and this CS call is to be used to bear the real-time media component;

in the case that a non-real-time media component for the session with the CSI UE is to be added, if no IMS session exists between the CSI-IW and the CSI UE, the CSI-IW initiates a new non-real-time IMS session with the CSI UE; if an IMS session already exists between the CSI-IW and the CSI UE, the CSI-IW initiates a change on the existing non-real-time IMS session with the CSI UE, so that a new non-real-time media component is added.

3) If the media bearing part for the session with the CSI UE changes, the CSI-IW initiates a change on information of the media bearing for the session with the IMS UE;

4) If the media bearing part for the session with the IMS UE changes, the CSI-IW initiates a change on information of the media bearing for the session with the CSI UE; and 5) The CSI-IW can further combine the above-mentioned media addition and removal in any way, so as to meet particular demands in particular scenarios.

Hereinafter, embodiments of the present invention will be described in detail with reference to FIGS. 5 to 8.

Figure 5:
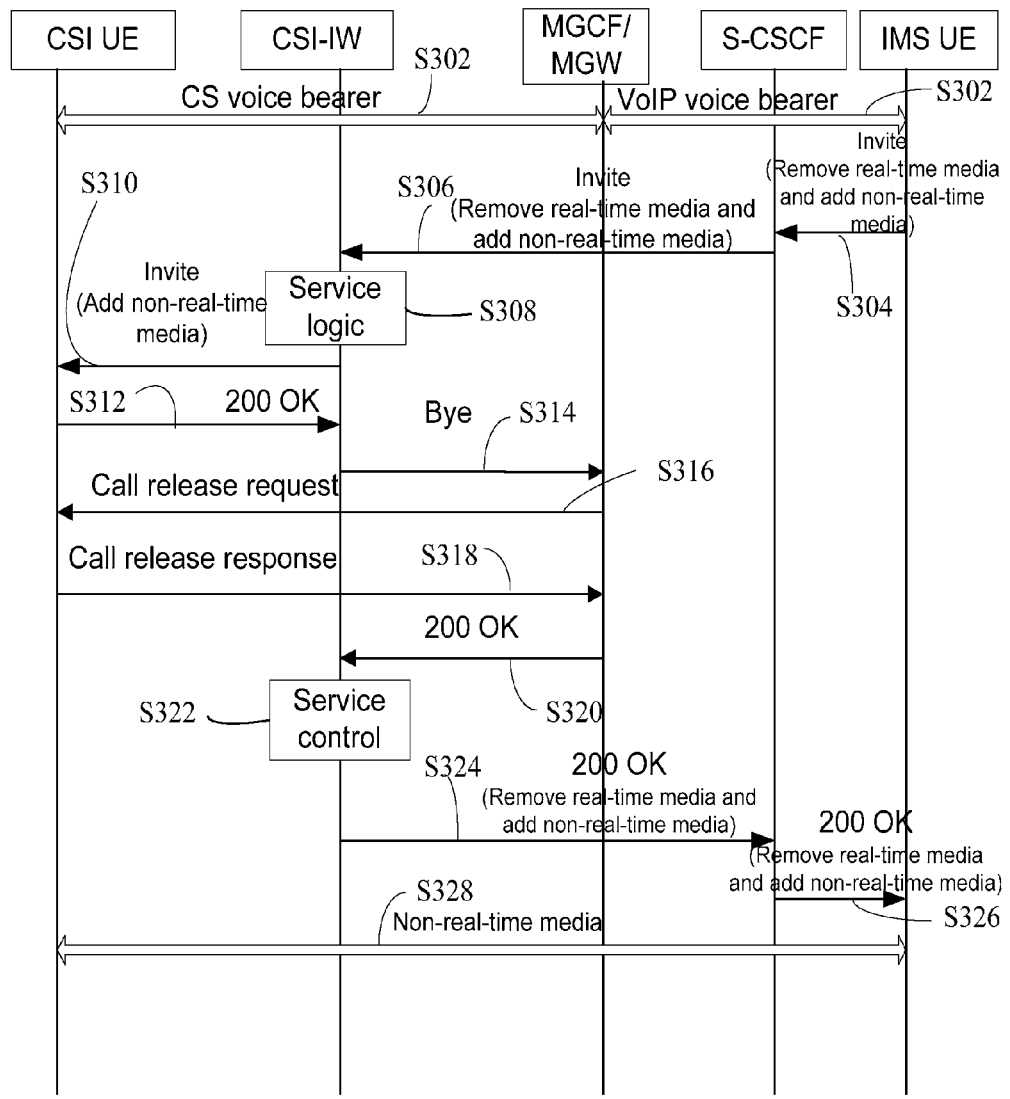
FIG. 5 shows an example of changing a real-time media to a non-real-time media during interworking between a CSI UE and an IMS UE according to an embodiment of the present invention.

FIG. 5 shows an example of changing a real-time media to a non-real-time media during interworking between a CSI UE and an IMS UE according to an embodiment of the present invention.

As shown in FIG. 5, the process specifically includes the following steps.

At step S302, a real-time media has been setup between the CSI UE and the IMS UE, and the media includes two segments, one of which is CS bearer between the CSI UE and the MGW, the other is IP bearer between the MGW and the IMS UE. During setup of the session, the S-CSCF for the home domain of the CSI UE routes the initial session request to the CSI-IW for processing, and the CSI-IW chooses to stay on the path of the session.

At step S304, the IMS UE initiates a request for a media change, such as an Invite, to request removing the real-time media and adding a non-real-time media.

At step S306, the relevant IMS function forwards the request message to the CSI-IW;

At step S308, the CSI-IW makes a determination on the service logic.

At step S310, the CSI-IW initiates a request for an IMS session with the IMS part of the CSI UE, with the session request carrying information of adding a non-real-time media.

At step S312, the CSI UE sends a response message, such as an 200 OK, to the request for adding the non-real-time session.

At step S314, the CSI-IW initiates a Bye request to the MGCF in the IMS.

At step S316, upon the receipt of the Bye request, the MGCF initiates a call release request to the CS part of the CSI UE.

At step S318, the CSI UE sends a response message for the call release.

At step S320, the MGCF maps the response message for the call release into a 200 OK to be sent to the CSI-IW.

At step S322, the CSI-IW performs the service logic control.

At step S324, the CSI-IW sends a 200 OK response to the relevant IMS function.

At step S326, the relevant IMS function forwards the 200 OK response to the IMS UE.

At step S328, a non-real-time media is setup between the CSI UE and the IMS UE, and the original real-time media is removed.

Figure 6:
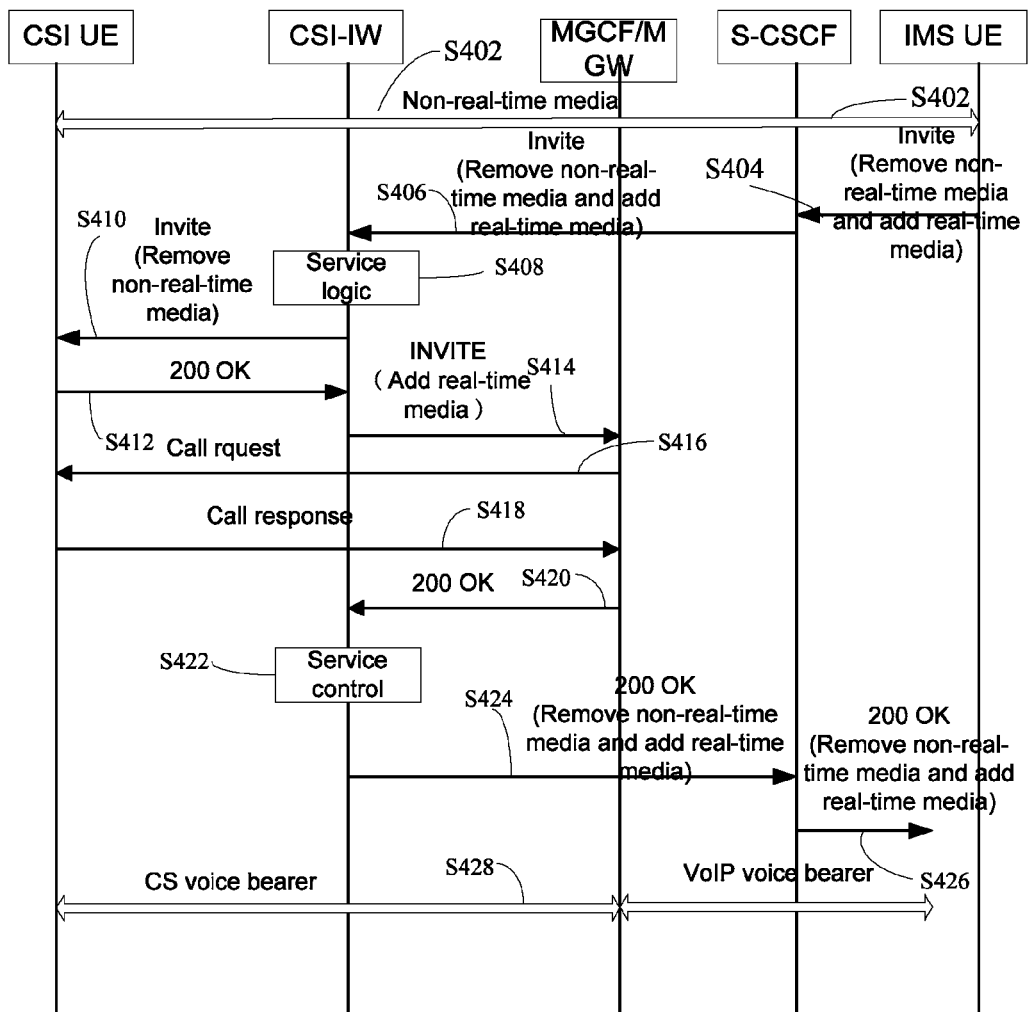
FIG. 6 shows an example of changing a non-real-time media to a real-time media during interworking between a CSI UE and an IMS UE according to an embodiment of the present invention.

FIG. 6 shows an example of changing a non-real-time media to a real-time media during interworking between a CSI UE and an IMS UE according to an embodiment of the present invention.

As shown in FIG. 6, the process specifically includes the following steps.

At step S402, a non-real-time media has been setup between the CSI UE and the IMS UE. During setup of the session, the S-CSCF for the home domain of the CSI UE routes an initial session request to the CSI-IW for processing, and the CSI-IW chooses to stay on the path of the session;

At step S404, the IMS UE initiates a request for media change, such as an Invite, to request removal of the non-real-time media and addition of the real-time media.

At step S406, the relevant IMS function forwards the request message to the CSI-IW.

At step S408, the CSI-IW makes a determination on the service logic.

At step S410, the CSI-IW initiates a request for an IMS session with the IMS part of the CSI UE, with the session request carrying information of deleting the non-real-time media.

At step S412, the CSI UE sends a response message such as a 200 OK to the request for removing the non-real-time media.

At step S414, the CSI-IW initiates a request for a real-time media session with the CSI UE.

At step S416, upon the receipt of the request for a real-time session, the MGCF initiates a request for a call to the CS part of the CSI UE.

At step S418, the CSI UE sends a response message to the call.

At step S420, the MGCF maps the response message to the call into a 200 OK to be sent to the CSI-IW.

At step S422, the CSI-IW performs the service logic control. At step S424, the CSI-IW sends the 200 OK response to the relevant IMS function.

At step S426, the relevant IMS function forwards the 200 OK response to the IMS UE.

At step S428, a real-time media is setup between the CSI UE and the IMS UE, and the original non-real-time media is removed.

Figure 7:
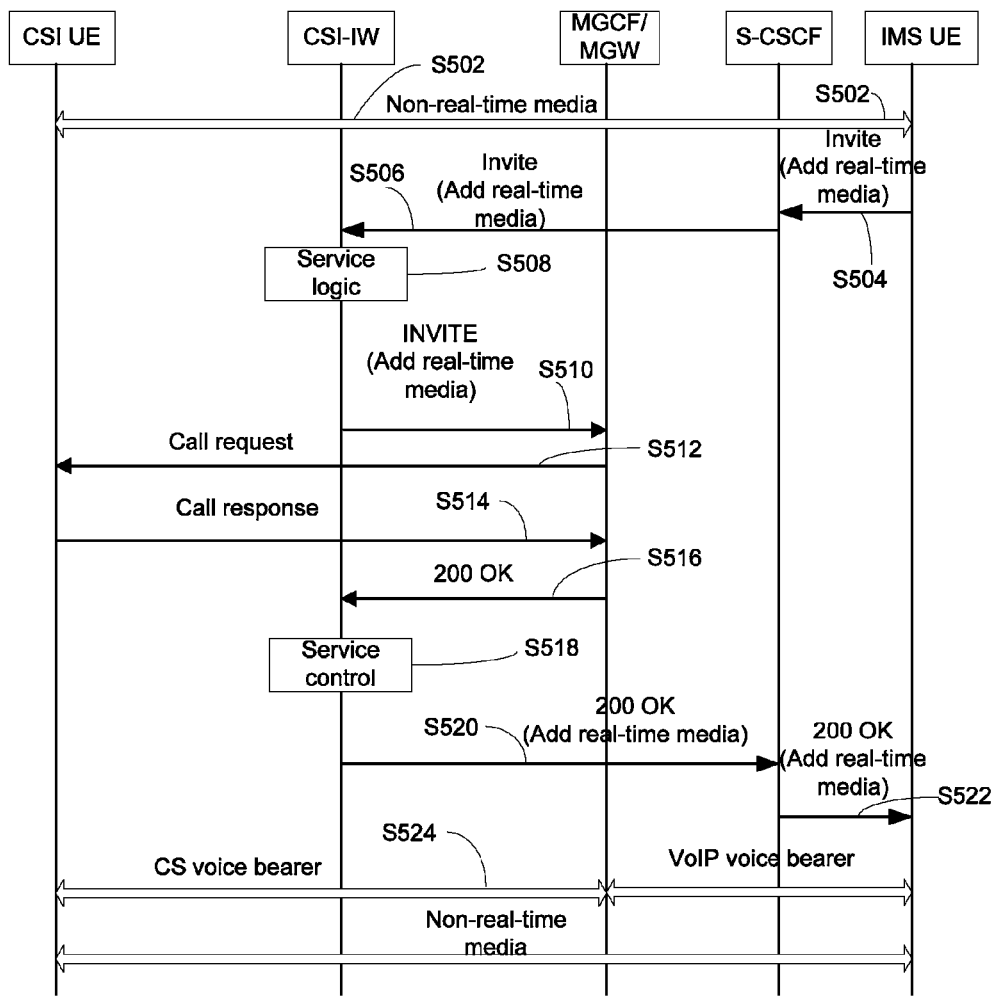
FIG. 7 shows an example of adding a real-time media component during interworking between a CSI UE and an IMS UE according to an embodiment of the present invention.

FIG. 7 shows an example of adding a real-time media component during interworking between a CSI UE and an IMS UE according to an embodiment of the present invention.

As shown in FIG. 7, the process includes the following steps.

At step S502, a non-real-time media has been setup between the CSI UE and the IMS UE. During the setup of the session, the S-CSCF for the home domain of the CSI UE routes the initial session request to the CSI-IW for processing, and the CSI-IW chooses to stay on the path of the session.

At step S504, the IMS UE initiates a media change request such as an Invite, to request adding a real-time media.

At step S506, the relevant IMS function forwards the request message to the CSI-IW.

At step S508, the CSI-IW makes a determination on the service logic.

At step S510, the CSI-IW initiates a request for a real-time media session with the CSI UE.

At step S512, upon the receipt of the request for a real-time session, the MGCF initiates a call request to the CS part of the CSI UE.

At step S514, the CSI UE sends a response message to the call.

At step S516, the MGCF maps the response message to the call into a 200 OK to be sent to the CSI-IW.

At step S518, the CSI-IW performs the service logic control.

At step S520, the CSI-IW sends the 200 OK response to the relevant IMS function.

At step S522, the relevant IMS function forwards the 200 OK response to the IMS UE.

At step S524, a real-time media is established between the CSI UE and the IMS UE, and the original non-real-time media is maintained.

Figure 8:
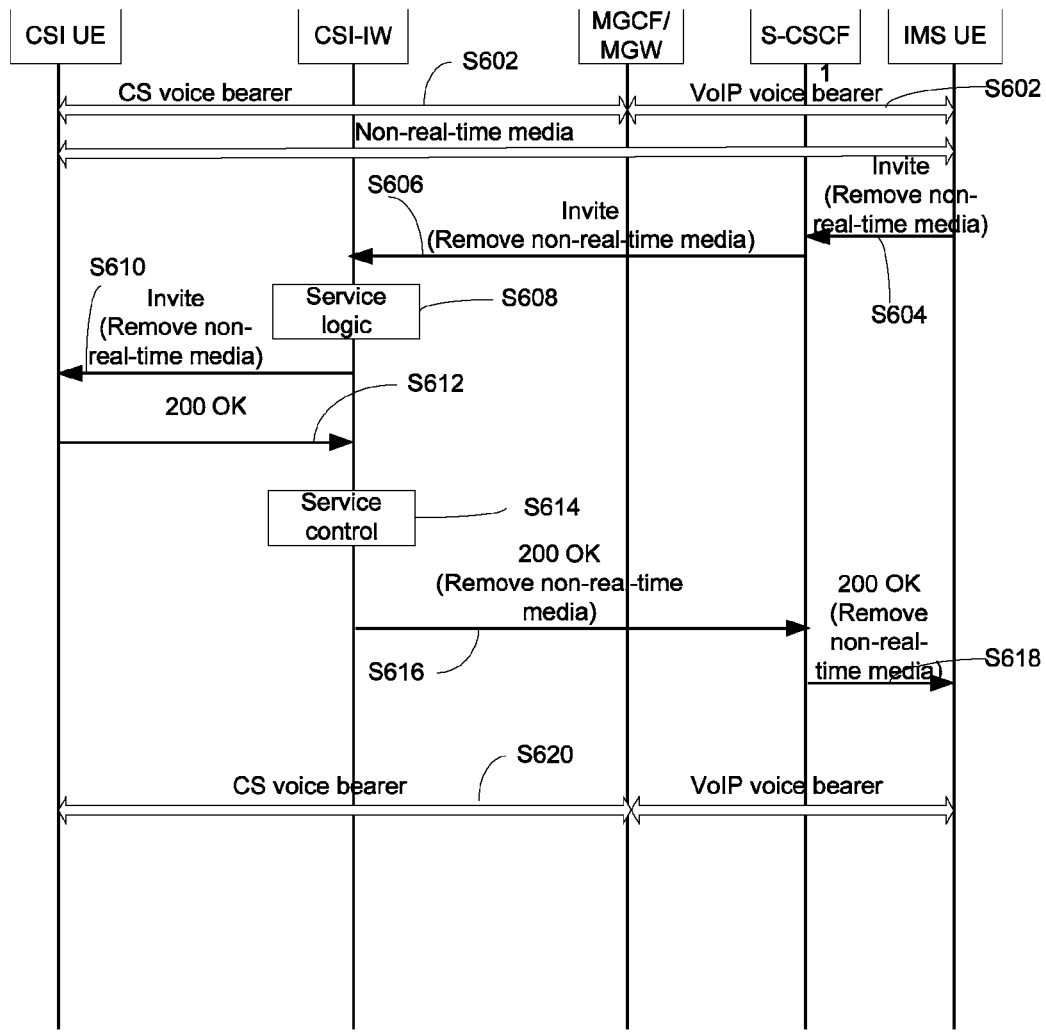
FIG. 8 shows an example of removing a non-real-time media component during interworking between a CSI UE and an IMS UE according to an embodiment of the present invention.

FIG. 8 shows an example of removing a non-real-time media component during interworking between a CSI UE and an IMS UE according to an embodiment of the present invention.

As shown in FIG. 8, the process includes the following steps:

At step S602, a non-real-time media and a real-time media have been setup between the CSI UE and the IMS UE. During the setup of the session, the S-CSCF for the home domain of the CSI UE routes the initial session request to the CSI-IW for processing, and the CSI-IW chooses to stay on the path of the session.

At step S604, the IMS UE initiates a media change request such as an Invite, to request removing the non-real-time media.

At step S606, the relevant IMS function forwards the request message to the CSI-IW.

At step S608, the CSI-IW makes a determination on the service logic.

At step S610, the CSI-IW initiates to the CSI UE a request for removing the non-real-time media session.

At step S612, the CSI UE sends a response message (e.g., a 200 OK) to the request.

At step S614, the CSI-IW performs the service logic control.

At step S616, the CSI-IW sends the 200 OK response to the relevant IMS function.

At step S618, the relevant IMS function forwards the 200 OK response to the IMS UE.

At step S620, the original non-real-time media is removed between the CSI UE and the IMS UE.

It can be seen from above description that the embodiments of the present invention implement the session change during interworking between a CSI UE and an IMS UE.

For the sake of convenience, the present invention is illustratively described with the interworking between a CSI UE and an IMS UE. However, the present invention are not limited to these two UEs, for example, the present invention is also applicable to other VoIP UEs.

While the present invention has been illustrated and described with reference to the preferred embodiments above, the present invention is not limited to these. It is apparent to those skilled in the art that various alternatives and modifications can be made. And all modifications, alternatives and improvements without departing from the scope of the present invention are intended to be within the protection scope of the invention.

The invention claimed is:

1. A method for session changing, adapted to change a session during interworking between a first UE and a second UE in a packet network, comprising:
reserving, during setup of an initial session between the first UE and the second UE, an interworking control function for controlling the interworking, on a path of the initial session; and
when a subsequent session change request is received, performing, by the interworking control function, a corresponding session changing operation according to contents of the subsequent session change request;
wherein, the contents of the session change request comprises at least one of:
removing at least one media component from a plurality of media components included in the initial session; adding at least one media component to the initial session; and processing upon a change on a media bearing part of the initial session;
wherein, the media components comprise a real-time media component and a non-real-time media component;
wherein, the session changing operation comprises at least one of the following operations:

1) if the real-time media component of the session with the first UE is to be removed, the interworking control function releases a Circuit Switch call with the first UE;
2) if the non-real-time media component of the session with the first UE is to be removed, the interworking control function initiates a change on media of an original non-real-time IMS session with the first UE, to remove the non-real-time media component from the media;
3) if the real-time media component of the session with the first UE is to be added:
    if a CS call with the first UE exists, adding of real-time media fails for this time; and
    if no CS call with the first UE exists, the interworking control function initiates a call to a CS part of the first UE, and the CS call is to be used to bear the real-time media component;
4) if the non-real-time media component of the session with the first UE is to be added:
    if no IMS session with the first UE exists, the interworking control function initiates a new non-real-time IMS session with the first UE; and
    if an IMS session with the first UE exists, a change on the original non-real-time IMS session with the first UE is initiated, to add a new non-real-time media component;
5) if the media bearing part for the session with the first UE is changed, the interworking control function initiates a change on information of media bearing for the session with the second UE; and
6) if the media bearing part of the session with the second UE is changed, the interworking control function initiates a change on information of media bearing for the session with the first UE.

2. The method for session changing according to claim 1, wherein:
both of the first UE and the second UE have IP Multimedia Subsystem (IMS) service capability; and
the reserving, during setup of the initial session between the first UE and the second UE, the interworking control function for controlling the interworking, on the path of the initial session comprises:
routing, by a Serving-Call Session Control Function for a home domain of the first UE, each of initial session requests to the interworking control function for processing, upon receipt of the initial session requests; and
obtaining, by the interworking control function, capability information of the first UE, capability information of an access network where the first UE is located, and a relevant service logic; and reserving the interworking control function on the path of the initial session if a preset condition is met.

3. The method for session changing according to claim 2, wherein, the preset condition is met in such case that the first UE has Combining CS and IMS services (CSI) capability, and/or that an IP access network for the first UE does not support real-time media bearing capacity.

4. The method for session changing according to claim 2, wherein the interworking control function obtains the capability information of the first UE through at least one of approaches of:
obtaining the capability information of the first UE from registration information of the first UE; and
querying the capability information of the first UE from a device management system.

5. A device for session changing, adapted to change a session during interworking between a first UE and a second UE in a packet network, comprising:

an initial session logic processing module, adapted to reserve, during setup of an initial session between the first UE and the second UE, an interworking control function for logically controlling the interworking, on a path of the initial session; and a session change performing module, adapted to perform, when the interworking control function receives a subsequent session change request, a corresponding session changing operation according to contents of the subsequent session change request;

wherein, the contents of the session change request comprise at least one of:

removing at least one media component from a plurality of media components included in the initial session; adding at least one media component to the initial session; and processing upon a change on a media bearing part of the initial session;

wherein, the media components comprise a real-time media component and a non-real-time media component;

wherein, the session changing operation comprises at least one of the following operations:

1) if the real-time media component of the session with the first UE is to be removed, the session changing operation comprises releasing a Circuit Switch call with the first UE;

2) if the non-real-time media component of the session with the first UE is to be removed, the session changing operation comprises initiating a change on media of an original non-real-time IMS session with the first UE, to remove the non-real-time media component from the media;

3) if the real-time media component of the session with the first UE is to be added:

the session changing operation comprises initiating a call to a CS part of the first UE, and the CS call is to be used to bear the real-time media component;

4) if the non-real-time media component of the session with the first UE is to be added:

the session changing operation comprises initiating a new non-real-time IMS session with the first UE; or, initiating a change on the original non-real-time IMS session with the first UE, to add a new non-real-time media component;

5) if the media bearing part for the session with the first UE is changed, the session changing operation comprises initiating a change on information of media bearing for the session with the second UE; and 6) if the media bearing part of the session with the second UE is changed, the session changing operation comprises initiating a change on information of media bearing for the session with the first UE.

6. A packet network system, comprising: a first UE and a second UE used in the packet network, and a Serving-Call Session Control Function for a home domain of the first UE, the packet network system further comprising:

an interworking control function, adapted to receive a session request from the Serving-Call Session Control Function, and to be reserved, during setup of an initial session between the first UE and the second UE, on a path of the initial session; and further adapted to perform, upon the receipt of a subsequent session change request, a corresponding session changing operation according to contents of the session change request;

wherein, the contents of the session change request comprise at least one of:

removing at least one media component from a plurality of media components included in the initial session; adding at least one media component to the initial session; and processing upon a change on a media bearing part of the initial session;

wherein, the media components comprise a real-time media component and a non-real-time media component;

wherein, the session changing operation comprises at least one of the following operations:

1) if the real-time media component of the session with the first UE is to be removed, the session changing operation comprises releasing a Circuit Switch call with the first UE;

2) if the non-real-time media component of the session with the first UE is to be removed, the session changing operation comprises initiating a change on media of an original non-real-time IMS session with the first UE, to remove the non-real-time media component from the media;

3) if the real-time media component of the session with the first UE is to be added:

the session changing operation comprises initiating a call to a CS part of the first UE, and the CS call is to be used to bear the real-time media component;

4) if the non-real-time media component of the session with the first UE is to be added:

the session changing operation comprises initiating a new non-real-time IMS session with the first UE; or, initiating a change on the original non-real-time IMS session with the first UE, to add a new non-real-time media component;

5) if the media bearing part for the session with the first UE is changed, the session changing operation comprises initiating a change on information of media bearing for the session with the second UE; and 6) if a change on the media bearing part of the session with the second UE is to be dealt with, the session changing operation comprises initiating a change on information of media bearing for the session with the first UE side.

7. The packet network system according to claim 6, wherein, the first UE comprises a Combining CS and IMS services UE, and the second UE comprises an IP Multimedia Subsystem UE.

* * * * *